United States Patent [19]
Zuccolotto

[11] 3,896,005
[45] July 22, 1975

[54] FILTERING AND DEBRIS REMOVING APPARATUS FOR CLEANING A SEA WATER STREAM

[76] Inventor: Hector M. Zuccolotto, Malintzin 44, Coyoacan, Mexico

[22] Filed: Sept. 13, 1973

[21] Appl. No.: 396,745

[52] U.S. Cl. ............... 202/185; 210/152; 210/333; 210/434
[51] Int. Cl.² .......................................... B01D 3/00
[58] Field of Search .......... 210/232, 275, 278, 294, 210/299, 312, 333, 334, 469, 411, 412, 169, 447, 152, 434; 202/185

[56] References Cited
UNITED STATES PATENTS

| | | | |
|---|---|---|---|
| 3,040,898 | 6/1962 | Simmons | 210/447 X |
| 3,111,487 | 11/1963 | Martin | 210/278 X |
| 3,179,253 | 4/1965 | McNeal | 210/447 X |
| 3,221,888 | 12/1965 | Muller | 210/412 X |
| 3,363,764 | 1/1968 | Whitaker | 210/411 X |
| 3,363,765 | 1/1968 | Rowe | 210/411 X |
| 3,465,885 | 9/1969 | Trump | 210/447 |
| 3,491,884 | 1/1970 | Baker | 210/169 |
| 3,512,644 | 5/1970 | Nash | 210/169 X |

*Primary Examiner*—Theodore A. Granger
*Attorney, Agent, or Firm*—Flynn & Frishauf

[57] ABSTRACT

A filtering and debris removing apparatus comprises a debris removing first chamber means; filtering means within said first chamber means, said filtering means dividing said first chamber means into an upstream compartment and a downstream compartment; debris-containing fluid entrance means connected to said upstream compartment adjacent one end of said filtering means; first valve means in said debris-containing fluid entrance means; service fluid outlet means connected to said downstream compartment; blowdown means connected to said upstream compartment adjacent the other end of said filtering means; and second valve means in said blowdown means.

4 Claims, 5 Drawing Figures

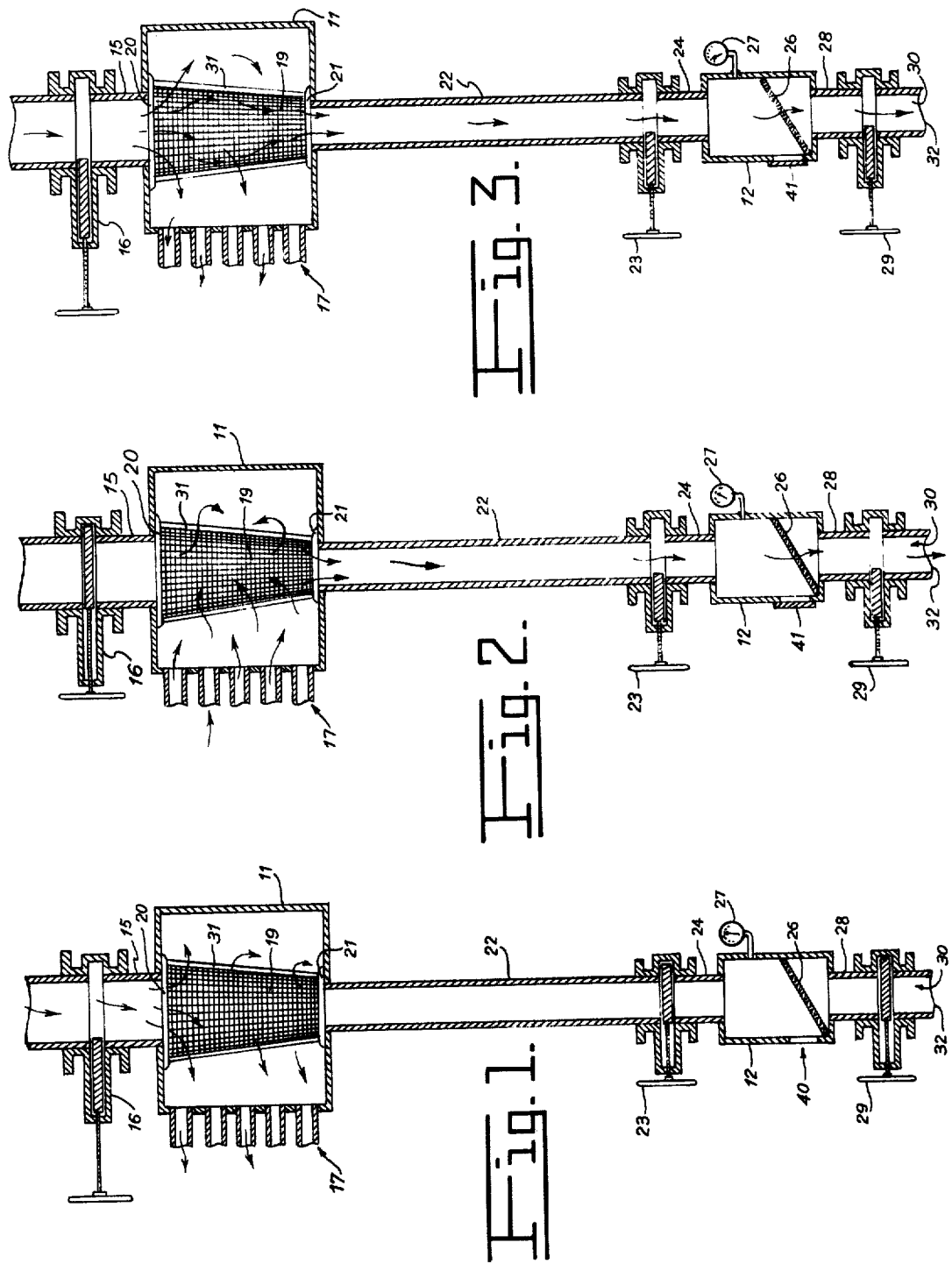

FILTERING AND DEBRIS REMOVING APPARATUS FOR CLEANING A SEA WATER STREAM

BACKGROUND OF THE INVENTION

The present invention refers to an apparatus for filtering service fluids and removing debris therefrom and, more particularly, it is related to an apparatus for filtering and removing debris from fluids used for circulation through the tube bundles of heat exchangers and the like, wherein said fluids are used as a coolant.

It is a very well known fact that, for example, in plants for producing fresh water from sea water by stepped distillation of sea water under increasing vacuum, a very serious problem has been confronted in view of the fact that all the condensers used to condense the steam generated by the sea water being distilled are fouled in a very short time because of the debris carried by the sea water used as a coolant to circulate through the tube bundles of said condensers.

Common filtering media used in these types of condensers have not been successful because said filtering media are clogged in a very short time by debris entrained in the sea water and thus the filters are rendered ineffective in an unduly short time, whereby they have not gained acceptance in sea water distilling plants, which means that the problem introduced by the debris carried by the sea water used to cool the condensers in this type of plants has remained heretofore unsolved.

While there are certain filtering means for removing debris from water in boilers and the like, using backflushing for the cleaning of the filtering means periodically, said filters are not efficient in view of the fact that the filtering medium is provided such that it can only be backflushed without any scrubbing action of the water over the filtering surface to disengage all the debris clogging said filtering medium. In other words, filtering devices used heretofore for cleaning water for boilers, merely provide a means for recirculating the boiler water and for backflushing the filtering media by means of the reversal of the flow of water, but do not provide for the scrubbing of the filtering surface by means of a direct passage of the water over the entire filtering surface of the filtering medium, in order to release any debris remaining thereon after completing the backflushing operation.

In the operation of sea water distilling plants for producing fresh water, the problem is still more critical, because of the fact that the availability of sea water renders it economical to run the condensers using sea water as a coolant. As the sea water carries very large amounts of debris, such as sand, garbage, shells and the like, which render filters ineffective in a very short time, the problems of filter-clogging and fouling are extremely critical, whereby the preference has heretofore been to completely avoid the use of filters for sea water entering into the tube bundles of condensers and the like. Therefore, very serious drawbacks have been experienced in the operation of said type of plants, which very frequently require complete stoppage for effecting thorough cleaning operations of the tube bundles of the condensers, heat exchangers and the like.

Therefore, an efficient means for cleaning sea water entering into the tube bundles of the condensers in sea water distilling plants has been for long seeked without any success. All type of filtering apparatus inserted in the water boxes of the condensers or in the pipes conducting the sea water thereinto, have been absolutely inefficient and have lead to frequent stoppage of the plants because the filters are fouled in a very short time thereby not permitting the efficient operation of the condensers which are a very important part of the plant itself.

It will be clear from the above that the main problem in the operation of this type of plants resides on the efficient cleaning and unclogging of the filtering media used, without the need of completely stopping the plant for effecting such cleaning operation.

BRIEF SUMMARY OF THE INVENTION

Having in mind the defects of the prior art filtering devices, it is an object of the present invention to provide a filtering and debris removing apparatus for cleaning a fluid intended for circulation through the tube bundles of heat exchangers and like equipment, in order to completely and efficiently remove the debris entrained in said fluid without the need of complete stoppage of the plant operation.

It is another object of the present invention to provide a filtering and debris removing apparatus of the above mentioned character, which will provide for the very efficient and complete unclogging of the filtering media without the need of stopping the plant for effecting cleaning operations.

It is a more particular object of the present invention to provide a filtering and debris removing apparatus of the above described character, which will provide for the scrubbing of the filtering surface for completely removing the debris left when back-washing the filters.

It is still another object of the present invention to provide a filtering and debris removing apparatus of the above mentioned character, which will enable cleaning thereof by a mere backflushing of a portion of the fluid from the service fluid outlet, aided by a scrubbing action effected by the fluid on the filtering surface.

Still another and more particular object of the present invention is to provide a filtering and debris removing apparatus of the above mentioned character, which will provide for the separate collection of debris removed from the filtering media, without the need of stopping the plant operation.

BRIEF DESCRIPTION OF THE DRAWING

The novel features that are considered characteristic of the present invention are set forth with particularity in the appended claims. The invention itself, however, both as to its organization and its method of operation, together with additional objects and advantages thereof, will best be understood from the following description of certain specific embodiments when read in connection with the accompanying drawings, in which:

FIG. 1 is a side elevational view of a preferred embodiment of a filtering and debris removing apparatus built in accordance with the present invention, shown in association with the tube bundle of a water vapor condenser in condition of normal operation.

FIG. 2 is a view similar to FIG. 1, but showing the condition of the filtering apparatus when backflushing of the water from the tube bundle is being effected.

FIG. 3 is a view similar to FIGS. 1 and 2, showing the filtering apparatus in the condition when scrubbing of the filtering media is being effected.

DETAILED DESCRIPTION

Figure 4:
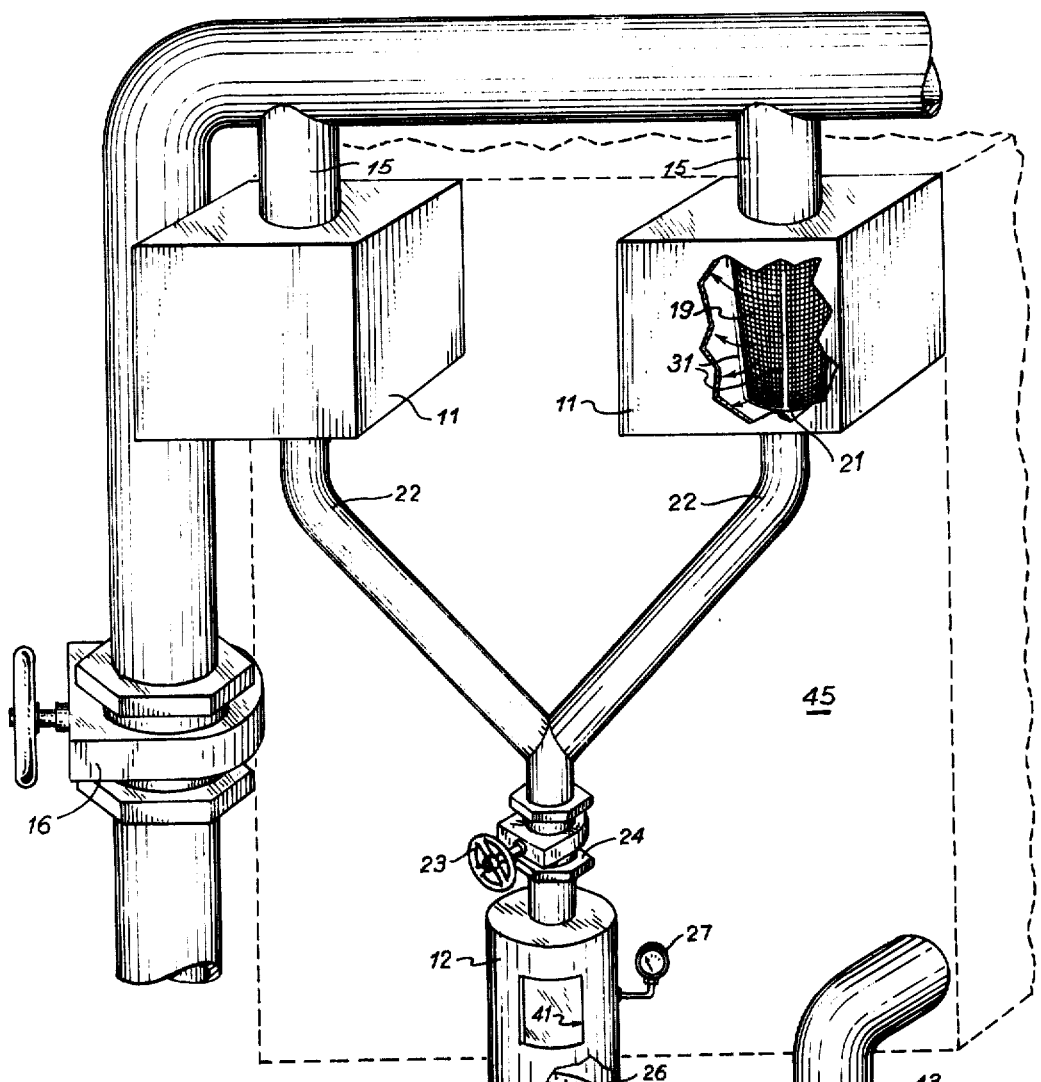
FIG. 4 a diagrammatic perspective view of another preferred embodiment of the invention, showing a multiplicity of filtering and debris removing apparatus in accordance with the present invention, connected to a common blowdown debris collecting compartment.

Having now more particular reference to the drawings and more specifically to FIGS. 1 to 3 thereof, there is shown a filtering and debris removing apparatus built in accordance with the present invention, working in association with a water box or header 11 provided at one end of a tube bundle 17 of a heat exchanger or the like which,, for illustrative purposes, has been shown as a tube bundle 17 of a sea water condenser for a sea water distillation plant for producing fresh water.

The water box or header 11 of the condenser is directly connected, through a wall thereof, to a plurality of tubes forming a tube bundle 17 through which sea water circulates in order to condense the steam generated within the vaccum chambers of a sea water distilling plant, whence the fresh water produced falls into suitably provided channels underneath the tube bundle of the condensers, to be removed as the product of the plant. The sea water for cooling purposes is fed to the tube bundle 17 through the water box or header 11 which is fed by means of a feed pipe 15 provided with valve means 16 as clearly illustrated in FIGS. 1 to 4 of the drawings.

The filtering and debris removing apparatus built in accordance with the present invention is provided in association with the water box 11 previously described, and comprises a screen 19 in the form of a frustoconical member spanning the whole distance between the top and the bottom of the water box. The frustoconical screen 19 is attached to an upper ring 20 which is tack welded to the top of the water box 11 and the lower end of said screen is also attached to a ring 21 which is tack welded to the bottom of said water box 11. The above mentioned installation of the frustoconical screen 19 provides for the filtration of all the sea water coming from feed pipe 15, through the water box 11 and to the tube bundle 17 as clearly illustrated in FIG. 1 of the drawings. The screen 19 is vertically supported by means of a plurality of equally spaced square bars 31 arranged along the circumference of rings 20 and 21, to which rings said square bars 31 are also tack welded in order to form a suitable supporting structure for the screen 19. Preferably the screen 19 is also supported by means of a plurality of wires wrapped around the rings 20 and 21 and the vertical bars 31.

A blowdown pipe 22 is connected to the bottom of the water box 11, colinearly with the feed pipe 15 connected to the top of said water box, whereby the frustoconical screen 19 provides for a direct communication between the feed pipe 15 and the blowdown pipe 22 as clearly illustrated in FIGS. 1 to 3 of the drawings, for a purpose which will be clearly and more thoroughly described hereinbelow.

A valve means 23 is provided at the lower portion of the blowdown pipe 22 and said valve means is connected by means of a pipe 24 to the top of a debris collecting compartment 12, in which a suitable screening plate 26 is arranged in an inclined position as shown in FIGS. 1 to 3 of the drawings. The lower end of the screening plate 26 is supported on the corner between bottom and side wall of the debris collecting compartment 12, whereas the remaining circumference thereof bears on the side wall of said compartment 12. An opening 40 is provided, on the said side wall, above the screening plate 26, and a lid 41 is installed to cover and uncover said opening 40, for purposes of enabling removal of the debris collected on the screening plate 26 as will be described in more detail hereinbelow.

A pressure gauge 27 is provided on the upper chamber of the debris collecting compartment 12, that is, on the chamber formed above the screening plate 26, and the lower chamber of said debris collecting compartment 12, that is, the portion below the screening plate 26, is connected, at the bottom thereof, to a purging pipe 28 provided with valve means 29 which can discharge the fluid through a pipe 30 to a lower pressure system (not shown) generally indicated by means of reference character 32 in FIGS. 1 to 3 of the drawings.

It will be clear to anyone skilled in the art that the filtering and debris removing apparatus described in connection with FIGS. 1 to 3 of the drawings, can be used in association with any type of heat exchanger or other device to clean the service fluid entering into a tube bundle or the like. As a preferred embodiment of the invention, the filtering and debris removing device built in accordance with the present invention can be used for removing debris from sea water entering into the tube bundle of a condenser of a sea water distilling plant, in accordance with the embodiment shown in FIG. 4 of the drawings.

It can be seen from FIG. 4 that sea water is fed through a general line 34 comprising a valve 16, to each of the condensers of the vacuum chambers 45 of the sea water distilling plant. The general line 34 discharges to water boxes 11 which in the particular case of the illustration comprises two water boxes 11, through feed pipes 15 and into the water boxes 11. The filter 19 is installed as described above, and blowdown pipes 22 are connected to the bottom of said water boxes also as described in connection with FIGS. 1 to 3 of the drawings. For purposes of convenience, a plurality of blowdown pipes 22 can be connected together as shown in FIG. 4, whereby said plurality of blowdown pipes 22 converge into a general discharge 24 provided with valve means 23 to discharge the blowdown fluid to an individual debris collecting compartment 12 as described above. The lower chamber of the debris compartment 12, that is, the chamber formed below the screening plate 26, is connected by means of pipe 28, valve 29 and purging pipe 30, to a line 43 which enters into the vacuum chambers 45 of the sea water distilling plant, so as to provide a lower pressure system which can apply to the debris removing apparatus of the present invention, on the exit thereof, a pressure which is lower than the pressure of the entering sea water in the water boxes so as to furnish a continuous flow of blowdown fluid when the filters are to be cleaned from the debris accumulating and clogging the same.

Figure 5:
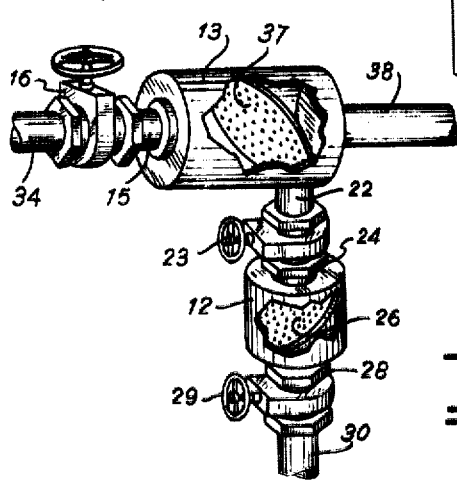
FIG. 5 is a diagrammatic perspective view of still another embodiment of the filtering and debris removing apparatus of the invention, shown in association with a feed line to a serviced apparatus.

As another particularly preferred embodiment of the invention, FIG. 5 of the accompanying drawings shows a filtering and debris removing apparatus built in accordance with the present invention, which can be used when no water boxes or headers are available prior to the entrance to the tube bundle of the heat exchangers or the like, and where space requirements do not permit installation of a water box to feed the cooling water to said tube bundle.

In accordance with FIG. 5 of the drawings, the filtering and debris removing apparatus accordance with the present invention comprises a debris removing chamber 13 connected at tone side to the feed pipe 15 which feeds the cooling water through a valve 16 from line 34. Chamber 13 contains an inclined filtering plate 37, such that the feed water coming from the pipe 15 impinges on the lower face of said inclined filtering plate 37 as clearly illustrated in FIG. 5 of the drawings, whereby said feed water is filtered and carried to the heat exchangers through line 38. The blowdown pipe 22 is connected to the lowermost portion of the chamber 13, such that it coincides with the lower end of the filtering plate 37, said blowdown pipe 22 being in turn connected through valve 23 and pipe 24, to the debris collecting compartment 12 which is exactly the same as that described in connection with FIGS. 1 to 4 of the drawings.

Having now reference again to FIGS. 1 to 3 of the drawings, it will be seen that, when the heat exchanger containing the tube bundle 17 is working normally, the cooling water is fed through the feed pipe 15, having the valve 16 fully opened, to the water box 11 where the water is duly filtrated and the debris entrained therein is removed by the screen 19 provided at the entrance of the feed pipe 15, as clearly illustratedby means of the arrows in FIG. 1 of the drawings. The cleaned water passes through the screen 19 and, as the blowdown valve 23 is fully closed, all the flow of water will be towards the tube bundle 17 as also illustrated by means of the arrows in FIG. 1 of the drawings.

After some time, the screen 19 will be fouled with debris and a backflushing step for cleaning the screen 19 will become necessary. In order to effect the backflushing operation, valve 16 is fully closed to avoid entrance of cooling water to the water box 11 through the screen 19 and blowdown valve 23 as well as purging valve 29 are fully opened as illustrated in FIG. 2. Thus, the water in the tube bundle 17 which in itself serves as the backwash fluid source in view of its large volume; will violently reverse its direction of flow under the action of the low pressure source connected at 30, thus shaking and backflushing the screen 19, as indicated by means of the arrows in FIG. 2, whereby the backflushing water will flow through the blowdown pipe 22, blowdown valve 23 into the debris collecting compartment 12, wherein the debris pushed out by the backflushing operation out of the water box 11, collects on the screening plate 26, and the blowdown liquid continues its flow through purging pipe 28, purging valve 29 and line 30 which leads to a lower pressure system as described above. Of course that the lid 41 of the debris collecting compartment 12 is fully closed as shown, whereby the pressure in the debris collecting compartment will be suitably lower as indicated by the pressure gauge 27, in order to provide for a violent backflushing flow of liquid to efficiently clean the screen 19 and collect the debris on the screening plate 26.

Once the backflushing operation is completed, which will only take a few seconds, whereby the operation of the condensers does not need to be stopped because the liquid remaining in the tube bundle 17 will continue to condense the steam generated or to cool the fluid outside the tube bundle, a scrubbing operation is started as illustrated in FIG. 3 of the drawings.

It has been found that the backflushing operation may not be sufficient, in many instances, to fully and thoroughly clean the screen 19, whereby if a filtering and debris removing apparatus is operated merely by backflushing the screen to clean the same, said cleaning operation will not be sufficient and the screen will be clogged in a short time beyond remedy. It is one of the main purposes of the present invention to provide for a scrubbing action of the filtering surface of the screen 19, in order to completely remove all the remaining debris which the backflushing operation could not release from the screen 19.

In order to effect this scrubbing operation, under the action of the low pressure source connected at 30, valve 16 is again fully opened in order to allow entrance of feed water through the feed pipe 15, but leaving the blowdown valve 23 as well as the purging valve 29 fully open in order to maintain the lower pressure in the system, as indicated by the pressure gauge 27. The violent flow of feed water through the feed pipe 15 and into the water box 11, will cause a substantial proportion of said water to scrub the filtering surface of screen 19, releasing and carrying therewith the remaining debris through blowdown pipe 22, blowdown valve 23 into the debris collecting compartment 12. Of course that part of the water continues to flow through screen 19, into the water box 11 and to the tube bundle 17 of the heat exchanger, whereby said heat exchanger may proceed its normal operation while at the same time a violent scrubbing action is being effected to completely and thoroughly clean the filtering medium 19 from any remaining debris.

It may be clearly seen that the cleaning operation of the filtering media in accordance with the present invention does not require stopping of the pant operation. In effect, as the backflushing operation if of a short duration, the heat exchanger or the like does not need to be stopped, because the cooling fluid remaining in the tube bundle will be sufficient to support the cooling action while the filter is being backflushed. On the other hand, the scrubbing operation is effected with passage of water to the exchanger.

After finishing the scrubbing operation, the blowndown valve 23 and the purge valve 29 are closed to thereby isolate the debris collecting compartment 12, whereby the lid 41 can be removed from the opening 40, and all the debis collected on the screening plate 26 can be removed through said opening 40 in order to prepare the debris collecting compartment 12 for a further operation as described above.

It will be clearly seen that the embodiment shown in FIG. 5 of the drawings operates in the same manner, and that the filtering plate 37 provided at the chamber 13 inserted in the feed pipe is arranged in such a manner that the filtering surface will be the lower surface thereof, whereby the backflushing opepration from pipe 38 into chamber 13 and through the filtering plate 37 will loosen and remove all the debris accumulated on siad lower surface of the filtering plate 37, toward the blowdown pipe 22, blowdown valve 23, piipe 24, debris collecting compartment 12 where the debris is maintained on the screening surface of the screening plate 26 in the same manner described above in connection with the embodiment shown in FIGS. 1 to 4 of the drawings. The scrubbing action is also efficiently effected by the flow of water from the line 34, feed valve 16, feed pipe 15 into the chamber 13, filtering surface of the filtering plate 37 and down into the blowdown pipe 22 as before. A proportion of the water scrubbing the filtering surface of the screening plate 37 will of course pass through said screening plate toward pipe 38 into the heat exchanger or the like.

It will be seen from the above that a novel filtering and debris removing apparatus has been provided by the present invention, which completely avoids the necessity of stopping the heat exchanger or the like associated with said filtering and debris removing apparatus and which provides for the efficient and thorough cleaning of the filtering media without the need of s topping the operation of the plant.

The filtering and debris removing apparatus built in accordance with the present invention provides, in addition to a backflushing operation for cleaning the filtering media, an efficient scrubbing operation of the filtering surface of said filtering media by the action of the feed fluid, whereby said filtering media is thoroughly cleaned from debris without the need of stopping the operation of the plant in which said filtering and debris removing apparatus is included.

In view of the provision of the additonal scrubbing action of the apparatus built in accordance with the present invention, the backflushing operation does not need to be very long and a few seconds will suffice, whereby the heat exchangers to which the water is fed as a coolant or the like, may continue its normal operation in view of the fact that the water remaining in the tube bundles will be sufficient to maintain the cooling action thereof and thus the flow of the vapors or liquids to be cooled by said tube bundle does not need to be interrupted at all. As the scrubbing action itself is effected while the heat exchanger is operating, it will be clear to anyone skilled in the art that the filtering and debris removing apparatus in accordance with the present invention provides for the first time means to clean a filter without the need of stopping the associated apparatus with which it works. Also, as the debris collecting compartment is completely separate and can be operated independently from the filtering medium, the debris can be removed therefrom without having the need of stopping the operation of the heat exchangers or the like in cooperation with which the filtering and debris collecting apparatus works.

While in the above the source of backwash fluid has been described as being comprised by the tube bundles of the condensers, in view of the fact that said tube bundles have a very large volumetric capacity which renders them sufficient to act as suitable backwash fluid sources, it will be obvious to one skilled in the art that an additional or separate source of backwash fluid can be used without thereby departing from the true spirit and scope of the present invention.

Although the invention has been shown and described in connection with certain specific embodiments thereof, it is to be understood that many modifications are possible. The invention, therefore, is not to be restricted except insofar as is necessitated by the prior art and by the spirit of the appended claims.

What is claimed is:

1. A filtering and debris removing apparatus for cleaning a coolant liquid stream comprising:

a liquid evaporator which comprises a vacuum chamber means, (45), and a condenser including a tube bundle means (17) within said vacuum chamber means (45);

at least two debris removing chamber means (11) coupled to said condenser;

strainer means (19) within each of said debris removing chamber means (11) and having ends extending between a pair of opposing walls thereof for dividing each of said debris removing chamber means (11) into a respective upstream compartment and a downstream compartment;

debris containing coolant liquid entrance means (34, 15, 16) discharging into said respective upstream comopartments of said debris removing chamber means (11) and adjacent an end of said strainer means (19);

first valve means (16) in said debris containing coolant liquid entrance means (34, 15, 16);

coolant liquid outlet means sidewardly leading from said respective downstream compartments of saidi debris removing chamber means (11) to the inlet of said tube bundle means (17) of said condenser;

blowdown pipe means (22) leading from said respective upstream compartments and adjacent the other ends of said strainer means (19);

second valve means (23) coupled to said blowdown pipe means (22);

debris collecting means (12) connected in common to at least two debris removing chamber means (11) through said blowdown pipe means (22) and through said second valve means (23);

screening means (26) in said debris collecting means (12) for collecting debris and dividing said debris collecting means (12) into an upstream and a downstream portion, said blowdown pipe means (22) being connected to said upstream portion;

means (40) in said upstream portion of said debris collecting means (12) for removing debris collected on said screening means (26);

fluid discharge means (28) leading from the downstream portion of said debris collecting means (12) to said vacuum chamber means (45) of said liquid evaporator; and third valve means (29) in said fluid discharge means (28);

whereby with said first valve means (16) open and in said second (23) ang third (29) valve means closed said debris containing coolant liquid is filtered by flow thereof through said debris containing coolant liquid entrance means, first valve means (16), upstream compartment, strainer means (19), downstream compartment, coolant liquid outlet means and into said tube bundle means (17), while at the same time maintaining said debris collecting means (12) isolated from said debris removal chamber means (11) and said vacuum chamber means (45) to provide for the disposal of the debris previously collected thereby;

whereby with said first valve means (16) closed and said second (23) and third (29) valve means open the previously filtered liquid in said tube bundle means (17) acts as a source of backwash fluid for backwashing said strainer means (19) by flow of said filtered coolant liquid from said tube bundle means (17) through said coolant liquid outlet means, downstream compartment, strainer means (19), upstream compartment, blowdown pipe means (22), second valve means (23), debris collecting means (12), fluid discharge means (28), third valve means (29) and into said vacuum chamber means (45); and whereby with said first (16), second (23) and third (29) valve means open a scrubbing action is effected over the entire upstream filtering surface of said strainer means (19) by violent flow of debris containing coolant liquid from siad debris containing coolant liquid entrance means (34, 15, 16) through said first valve means (16), upstream compartment fully scrubbing the upstream surface of said strainer means (19), blowdown pipe means (22), second valve means (23), debris collecting means (12), fluid discharge means (28), third valve means (29), and into siad vacuum chamber means (45), with part of said coolant liquid being simultaneously filtered through said strainer means (19) to pass through said downstream compartment and said coolant liquid outlet means into said tube bundle means (17) in order to permit substantially continuous operation of said condenser.

2. A filtering and debris removing apparatus according to claim 1 wherein said strainer means (19) comprises a hollow frustoconical screen member vertically arranged within said debris removing chamber means (11), with the wider end of said frustoconical screen member engaged with the top of said debris removing chamber means (11) and the narrower end of said frustoconical screen member engaged with the bottom of said debris removing chamber means (11), thus forming an inner upstream comartment within said screen member and an outer downstream compartment around the outside of said screen member, said debris containing coolant liquid entrance means (34, 15, 16) discharging into the top of said inner compartment, said blowdown pipe means (22) being connected to the bottom of said inner compartment, and said coolant liquid outlet means being connected to sidewardly lead from said outer compartment.

3. A filtering and debris removing apparatus according to claim 1 wherein said strainer means (19) comprises a screen plate member (37) obliquely arranged within said debris removing chamber means (13—FIG. 5) so as to form said upstream compartment under the lower directed face of said screen plate member (37) and said downstream compartment above the upper directed face thereof, said debris containing coolant liquid entrance means (34, 15, 16) horizontally discharging into said upstream compartment adjacent the uppermost section of the lower face of said screen plate member (37), said blowdown pipe means (22) being connected to the bottom of said upstream compartment adjacent the lowermost section fo the lower face of said screen plate member (37), and said coolant liquid outlet means being connected to sidewardly lead from said downstream compartment of the other side of said screen plate member (37).

4. A filtering and debris removing appartus according to claim 1 wherein said coolant liquid is sea water.

* * * * *